United States Patent Office 3,631,168
Patented Dec. 28, 1971

1

3,631,168
TETRAHYDRO-PYRROLO[2,1-b]OXAZOLE - 5(6H)-ONES, HEXAHYDRO - 5H - OXAZOLO[3,2-a]PYRIDINE-5-ONES, TETRAHYDRO - 2H - PYRROLO [2,1-b]1,3 OXAZINE - 6(7H) - ONES AND HEXAHYDRO - 2H, 6H-PYRIDO[2,1-b]1,3 OXAZINE-6-ONES
Wilfried Graf, Binningen, and Erich Schmid, Basel, Switzerland, assignors to Geigy Chemical Corporation, Ardsley, N.Y.
No Drawing. Continuation of application Ser. No. 429,892, Feb. 2, 1965. This application Mar. 20, 1967, Ser. No. 624,631
Claims priority, application Switzerland, Feb. 11, 1964, 1,631/64
Int. Cl. C07d 87/06
U.S. Cl. 260—244
17 Claims

ABSTRACT OF THE DISCLOSURE

This invention relates to compounds of the formula:

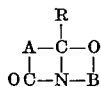

wherein

R is a member selected from the group consisting of
(a) thienyl-(2) and (b) phenyl which is substituted by a member selected from the group consisting of hydrogen, lower alkyl, lower alkoxy, lower alkylthio, lower alkylsulfonyl amino, N-lower alkyl-substituted amino, lower alkanoylamino, sulfamyl, N-lower alkyl-substituted sulfamyl, hydroxyl, nitro, trifluoromethyl and halogen of one of the atomic numbers 9, 17 and 35, A represents straight-chain alkylene of from 2 to 3 carbon atoms substituted by a member selected from the group consisting of hydrogen, lower alkyl and phenyl, and B represents straight-chain alkylene of from 2 to 3 carbon atoms substituted by a member selected from the group consisting of hydrogen and lower alkyl.

These compounds have anti-inflammatory, anesthesia-potentiating, anti-convulsive and analgetic activity.

RELATED APPLICATION

This application is a continuation of application Ser. No. 429,892, filed Feb. 2, 1965, now abandoned.

The present invention concerns a process for the production of new heterocyclic compounds as well as the new compounds obtained by this process.

It has surprisingly been found that heterocyclic compounds are obtained of the formula

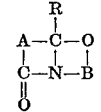

wherein

R represents a phenyl radical substituted, if desired, by lower alkyl, alkoxy, alkylthio alkylsulfonyl, alkylamino, dialkylamino, alkanoylamino, alkylsulfamoyl or dialkylsulfamoyl groups, hydroxyl, nitro, amino, sulfamoyl or trifluoromethyl groups and/or halogen atoms, or it represents the 2-thienyl radical, and A represents an ethylene or trimethylene radical which may be substituted by lower alkyl and/or phenyl radicals,

2

B represents an alkylene radical having 2–7 carbon atoms, whereof 2–3 between the two valences.

if a γ- or δ-ketocarboxylic acid or a derivative thereof corresponding to the general Formula II

wherein

X represents the hydroxyl group, chlorine, bromine or a low alkoxy group or alkanoyloxy group, in particular acetoxy group, and R and A have the meanings given in Formula I, which compound can also be wholly or partially in the tautomeric form corresponding to the general Formula III

is reacted with a compound of the general Formula IV $$H_2N-B-O-H \qquad (IV)$$

wherein B has the meaning given in general Formula I.

The new compounds produced by this process in a simple manner, generally in good yields, are surprisingly distinguished by valuable pharmacological properties. In particular, such compounds have anti-inflammatory, anesthesia-potentiating, anti-convulsive and analgetic activity and a toxicity not higher or even less than that of presently commercially available anti-inflammatory agents.

The anti-inflammatory activity of the compounds of general Formula I can be seen, for example, in cases of peritonitis induced by Formalin in animal experiments. Administration of 200 mg. per kg. body weight per os to rats of, for example, 9a-phenyl - hexahydro - 2H,6H - pyrido-[2,1-b][1,3]oxazine-6-one and 8a-(m-nitrophenyl)-tetrahydro-2H-pyrrolo[2,1-b][1,3]oxazine-6(7H)-one, caused a reduction of more than 45% in exudation compared with the control animals. In the convulsions caused in mice by intraperitoneal administration of 2.5 mg. of strychnine per kg. body weight which convulsions are always fatal without premedication, an extension of the surviving time of at least 200% compared with non-pretreated control animals and survival of a certain percentage of the animals is observed if 200 mg./kg. of 7a-(p-chlorophenyl-tetrahydro-pyrrolo[2,1-b]oxazole-5(6H)-one, 8a - phenyl-hexahydro - 5H - oxazolo[3,2-a]pyridine-5-one, 8a - (m-chlorophenyl)-tetrahydro - 2H - pyrrolo[2,1-b][1,3]oxazine-6(7H)-one   8a - (o-hydroxyphenyl)-tetrahydro-2H-pyrrolo[2,1-b][1,3]oxazine - 6(7H) - one or 9a-phenyl-hexahydro - 2H,6H - pyrido[2,1-b][1,3]oxazine-6-one are administered per os 60 minutes before the strychnine.

Therapeutical application of the new compounds of general Formula I is mainly oral or rectal. As they are also somewhat water soluble, they can be administered parenterally as aqueous solutions or, if necessary, as aqueous dispersions prepared with the aid of solubility promoters and/or emulsifying agents.

Compounds of the general Formula I, in particular those having hydroxyl and amino groups as substituents of R, can also be used as intermediate products, e.g. for the production of other pharmacologically valuable substances.

In the compounds of general Formula I and in the corresponding starting materials R is, for example, phenyl, o-, m- and p-tolyl, 2,3-, 2,4-, 3,4- 2,5- and 2,6-xylyl, o-, m- and p-ethylphenyl, p-propylphenyl, p-isopropylphenyl, p-butylphenyl, p-isobutylphenyl, p-tert.butylphenyl, o-, m- and p-fluorophenyl, o-, m- and p-chlorophenyl, o-, m- and p-bromophenyl, 2,4-dichlorophenyl, 2,5-dichlorophenyl, 3,4-dichlorophenyl, 2-methyl-4-chlorophenyl, 2-methyl-5-chlorophenyl, α,α,α-trifluoro-m-tolyl, α,α,α-trifluoro-p-tolyl, 2,4,6-trimethylphenyl, m-methoxyphenyl, p-methoxyphenyl, p-ethoxyphenyl, p-methylthiophenyl, o-hydroxyphenyl, m-hydroxyphenyl, p-hydroxyphenyl, 2-hydroxy-5-methylphenyl, p-methylsulphonylphenyl, p-acetamidophenyl, m-acetamidophenyl, m-aminophenyl, m-nitrophenyl, 3-acetamido-4-chlorophenyl, 3-amino-4-chlorophenyl, 2-hydroxy-4-chlorophenyl, 2-hydroxy-5-chlorophenyl, 2-hydroxy-5-methoxyphenyl, 3-sulphamoyl-4-chlorophenyl, m-dimethylsulfamyl-phenyl, 3-nitro-4-aminophenyl, 3-nitro-4-methylthiophenyl or 2-thienyl.

A is, for example, ethylene, trimethylene, phenylethylene, 2,2-dimethyltrimethylene, 1,2-diphenyltrimethylene.

B is, for example, ethylene, methylethylene, 1,1-dimethylethylene, 1,2-dimethylethylene, ethylethylene, trimethylene, 1-methyl-trimethylene, 2,2-dimethyl-trimethylene, 1,3-dimethyl-trimethylene or 2,2-diethyl-trimethylene.

The divalent radicals listed under A and B which are not symmetrical can actually be present in the molecule of the end product in the various arrangements possible.

Many of the compounds of the general Formulae II, III and IV used as starting materials are known and others can be produced by generally known processes.

The following compounds are mentioned as examples of starting materials of the general Formulae II and III:

3-benzoyl-propionic acid,
3-(m-fluorobenzoyl)-propionic acid,
3-(p-fluorobenzoyl)-propionic acid,
3-(m-chlorobenzoyl)-propionic acid,
3-(p-chlorobenzoyl)-propionic acid,
3-(p-bromobenzoyl)-propionic acid,
3-(m-nitrobenzoyl)-propionic acid,
3-(m-toluoyl)-propionic acid,
3-(p-toluoyl)-propionic acid,
3-(p-ethylbenzoyl)-propionic acid,
3-(p-isopropylbenzoyl)-propionic acid,
3-(p-tert.butylbenzoyl)-propionic acid,
3-(α,α,α-trifluoro-m-toluoyl)-propionic acid,
3-salicyloyl-propionic acid,
3-(m-hydroxybenzoyl)-propionic acid,
3-(p-anisoyl)-propionic acid,
2-phenyl-3-benzoyl-propionic acid,
2-phenyl-3-(p-anisoyl)-propionic acid,
4-benzoyl-butyric acid,
3,3-dimethyl-4-benzoyl-butyric acid,
3,3-dimethyl-4-(p-chlorobenzoyl)-butyric acid,
2,3-diphenyl-3-benzoyl-butyric acid,
2,3-diphenyl-4-(p-anisoyl)-butyric acid,
3-(2'-thenoyl)-propionic acid,
2-phenyl-3-(2'-thenoyl)-propionic acid,
4-(2'-thenoyl)-butyric acid,
3-benzoyl-propionic acid methyl ester,
4-chloro-4-phenyl-γ-butyrolactone 4-acetoxy-4-phenyl-γ-butyrolactone.

The following compounds are mentioned as starting materials of the general formula IV: 2-aminoethanol, 1-amino-2-propanol, 2-amino-1-propanol, 2-amino-2-methyl-1-propanol, 2-amino-1-butanol, 3-amino-1-propanol, 3-amino-1-butanol, 3-amino-2,2-dimethyl-1-propanol.

To produce the compounds according to the invention, an amine of the general Formula IV is reacted at temperatures of about 100–250° with a ketocarboxylic acid or a derivative thereof corresponding to general Formulae II and/or III, the reaction being performed in the presence or absence of a solvent such as, e.g. toluene, chlorobenzene, xylene, o-chlorotoluene, o-dichlorobenzene, nitrobenzene, amyl alcohol. The condensation according to the invention proceeds while splitting off the equimolar amount of the compound H—X and water and can be promoted, optionally, by agents splitting off water such as, e.g. zinc chloride, or by azeotropically distilling off the reaction water or of the alkanol or acetic acid liberated.

In certain cases, two reaction steps can be determined in the performance of the process according to the invention.

First, a ketocarboxylic acid amide is formed as intermediate product of the general Formula V

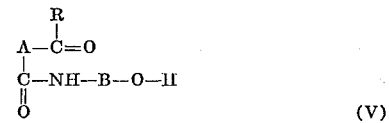

(V)

which, in many cases, can be wholly or partially in the tautomeric form corresponding to general Formula VI

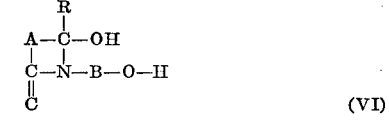

(VI)

in which Formulae R, A and B have the meanings given above, while a compound X—H, i.e. water, hydrogen halide, low alkanol or low alkanoic acid is split off. From this intermediate product, the end product of general Formula I according to the invention is formed by splitting off water under the reaction conditions given above. Thus, the present invention also embraces the production of these end products from intermediate products of general Formulae V and/or VI as described above.

This process is characterized by subjecting compounds of these general formulae to conditions which split off water, most simply by heating in a solvent which distills off azeotropically with water such as, e.g. chlorobenzene or o-dichlorobenzene, or by heating in the presence of an agent which splits off water such as, e.g. zinc chloride or magnesium perchlorate.

A preferred class of anti-inflammatory agents according to the invention are those compounds which fall under the formula

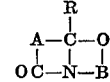

wherein

R is a member selected from the group consisting of (a) thienyl-(2) and (b) phenyl which is substituted by a member selected from the group consisting of hydrogen, lower alkyl, lower alkoxy, lower alkylthio, lower alkylsulfonyl, amino, N-lower alkyl-substituted amino, lower alkanoylamino, sulfamyl, N-lower alkyl-substituted sulfamyl, hydroxyl, nitro, trifluoromethyl and halogen of one of the atomic numbers 9, 17 and 35, A represents straight-chain alkylene of from 2 to 3 carbon atoms substituted by a member selected from the group consisting of hydrogen, lower alkyl and phenyl, and B represents straight-chain alkylene of from 2 to 3 carbon atoms substituted by a member selected from the group consisting of hydrogen and lower alkyl.

The following non-limitative examples further illustrate the invention. The temperatures are given therein in degrees centigrade. Parts and percentages are given by weight unless stated otherwise and the relationship of parts by weight to parts by volume is as that of grams to milliliters.

EXAMPLE 1

17.8 parts of 3-benzoyl-propionic acid, 7 parts of 2-aminoethanol and 250 parts of chlorobenzene are boiled and a mixture of water and chlorobenzene is distilled off for 45 minutes. The remaining solvent is then evaporated off under vacuum, the residue is extracted several times with hot ligroin, the combined extracts are clarified over charcoal and concentrated. The crystals obtained are recrystallised from a mixture of ether/petroleum ether. The pure 7a-phenyl-tetrahydropyrrolo[2,1-b]oxazole-5(6H)-one of the formula

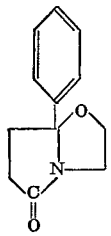

melts at 88°.

The following compounds are produced in an analogous manner:

(a) 7a-(p-tolyl)-tetrahydro-pyrrolo[2,1-b]oxazole-5(6H)-one, M.P. 78.5°;
(b) 7a-(p-chlorophenyl)-tetrahydro-pyrrolo[2,1-b]oxazole-5(6H)-one, M.P. 83.5°;
(c) 6,7a-diphenyl-tetrahydro-pyrrolo[2,1-b]oxazole-5(6H)-one, M.P. 141.5°, and
(d) 7a-(2'-hydroxyphenyl)-tetrahydro-pyrrolo[2,1-b]oxazole-5(6H)-one, M.P. 155°.

EXAMPLE 2

19.2 parts of 4-benzoyl-butyric acid and 7 parts of 2-aminoethanol in 180 parts of chlorobenzene are heated while distilling off water and chlorobenzene. The remaining chlorobenzene is removed in vacuo. The residue is distilled under high vacuum. The distillate solidifies and is recrystallised from pentane/ether. The pure 8a-phenyl-hexahydro-5H-oxazolo[3,2-a]pyridine-5-one of the formula

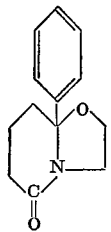

melts at 76.5°.

7,7 - dimethyl-8a-phenyl-hexahydro-5H-oxazolo[3,2-a]pyridine-5-one, M.P. 98°, is produced in an analogous manner.

EXAMPLE 3

17.8 parts of 3-benzoyl-propionic acid and 8 parts of 3-amino-1-propanol are heated for 1½ hours at 150°. The reaction product is purified by distillation under high vacuum; it then crystallises and is recrystallised from petroleum ether. The 8a-phenyl-tetrahydro-2H-pyrrolo[2,1-b][1,3]oxazine-6(7H)-one of the formula

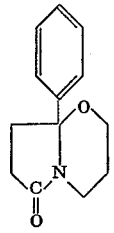

melts at 80°.

The following products are obtained in an analogous way:

(a) 8a-(p-chlorophenyl)-tetrahydro-2H-pyrrolo[2,1-b][1,3]oxazine-6(7H)-one, M.P. 62°;
(b) 8a-(p-tolyl)-tetrahydro-2H-pyrrolo[2,1-b][1,3]oxazine-6(7H)-one, M.P. 56°;
(c) 8a-(p-methoxyphenyl)tetrahydro-2H-pyrrolo[2,1-b][1,3]oxazine-6(7H)-one, M.P. 65.8°;
(d) 8a-(p-isopropylphenyl)-tetrahydro-2H-pyrrolo[2,1-b][1,3]oxazine-6(7H)-one, B.P. 132–136°/0.1 torr;
(e) 8a-(2'-thienyl)-tetrahydro-2H-pyrrolo[2,1-b][1,3]oxazine-6(7H)-one, M.P. 114°;
(f) 8a-(p-fluorophenyl)-tetrahydro-2H-pyrrolo[2,1-b][1,3]oxazine-6(7H)-one, M.P. 86.5°;
(g) 8a-(p-tert.butylphenyl)-tetrahydro-2H-pyrrolo[2,1-b][1,3]oxazin-6(7H)-one, M.P. 88.5°;
(h) 8a-(m-tolyl)-tetrahydro-2H-pyrrolo[2,1-b][1,3]oxazin-6(7H)-one, M.P. 86.8°;
(i) 8a-(m-chlorophenyl)-tetrahydro-2H-pyrrolo[2,1-b][1,3]oxazin-6(7H)-one, M.P. 99°;
(j) 8a-(m-fluorophenyl)-tetrahydro-2H-pyrrolo[2,1-b][1,3]oxazin-6(7H)-one, M.P. 87.5°;
(k) 8a-(m-methoxyphenyl)-tetrahydro-2H-pyrrolo[2,1-b][1,3]oxazin-6(7H)-one, B.P. 134–135°/0.04 torr;
(l) 7,8a-diphenyl-tetrahydro-2H-pyrrolo[2,1-b][1,3]oxazin-6(7H)-one, M.P. 82.5°;
(m) 8a-(o-hydroxyphenyl)-tetrahydro-2H-pyrrolo[2,1-b][1,3]oxazin-6(7H)-one, M.P. 118.5°;
(n) 8a-(α,α,α-trifluoro-m-tolyl)-tetrahydro-2H-pyrrolo[2,1-b][1,3]oxazin-6(7H)-one, M.P. 74°;
(o) 7-phenyl-8a-(2'-thienyl)-tetrahydro-2H-pyrrolo[2,1-b][1,3]oxazin-6(7H)-one, M.P. 127.5°;
(p) 8a-(m-nitrophenyl)-tetrahydro-2H-pyrrolo[2,1-b][1,3]oxazin-6(7H)-one, M.P. 133°, and
(q) 7-phenyl-8a-(p-methoxyphenyl)-tetrahydro-2H-pyrrolo[2,1-b][1,3]oxazin-6(7H)-one, M.P. 93°.
(r) 8a-(p-bromophenyl)-tetrahydro-2H-pyrrolo[2,1-b][1,3]oxazin-6(7H)-one;
(s) 8a-(p-aminophenyl-tetrahydro-2H-pyrrolo[2,1-b][1,3]oxazin-6(7H-one;
(t) 8a-(p-methylthio-phenyl)-tetrahydro-2H-pyrrolo[2,1-b][1,3]oxazin-6(7H)-one;
(u) 8a-(p-methylsulfonyl-phenyl)-tetrahydro-2H-pyrrolo[2,1-b][1,3]oxazin-6(7H)-one;
(v) 8a-(m-methylaminophenyl)-tetrahydro-2H-pyrrolo[2,1-b][1,3]oxazin-6(7H)-one;
(w) 8a-(p-dimethylaminophenyl)-tetrahydro-2H-pyrrolo[2,1-b][1,3]oxazin-6(7H)-one;
(x) 8a-(m-acetylamino-phenyl)tetrahydro-2H-pyrrolo[2,1-b][1,3]oxazin-6(7H)-one;
(y) 8a-(m-N-dimethyl-sulfamyl-phenyl)-tetrahydro-2H-pyrrolo[2,1-b][1,3]oxazin-6(7H)-one;
(z) 8a-(m-sulfamylphenyl)-tetrahydro-2H-pyrrolo[2,1-b][1,3]oxazin-6(7H)-one.

EXAMPLE 4

19.2 parts of 4-benzoyl-butyric acid, 9 parts of 3-amino-1-propanol and 250 parts of chlorobenzene are so heated that a mixture of water and cholrobenzene is distilled off for 1 hour. The remaining chlorobenzene is distilled off in vacuo and the residue is distilled under high vacuum. On recrystallising the already crystallised distillate from pentane/ether, pure 9a-phenyl-hexahydro-2H,6H-pyrido[2,1-b][1,3]oxazine-6-one of the formula

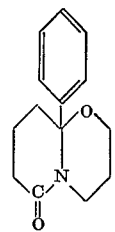

is obtained. It melts at 83°.

(a) 8,8-dimethyl-9a-phenyl-hexahydro-2H-pyrido[2,1-b][1,3]oxazine-6-one, M.P. 97.5°, and
(b) 7,8,9a-triphenyl-hexahydro-2H,6H-pyrido[2,1-b][1,3]oxazine-6-one, M.P. 217.5° are obtained in an analogous manner.

We claim:
1. A compound of the formula

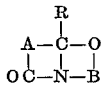

wherein
R is a member selected from the group consisting of (a) thienyl-(2) and (b) phenyl which is substituted by a member selected from the group consisting of hydrogen, lower alkyl, lower alkoxy, lower alkylthio, lower alkylsulfonyl, amino, N-lower alkyl-substituted amino, lower alkanoylamino, sulfamyl, N-lower alkyl-substituted sulfamyl hydroxyl, nitro, trifluoromethyl and halogen of one of the atomic numbers 9, 17 and 35,
A represents straight-chain alkylene of from 2 to 3 carbon atoms substituted by a member selected from the group consisting of hydrogen, lower alkyl and phenyl, and
B represents straight-chain alkylene of from 2 to 3 carbon atoms substituted by a member selected from the group consisting of hydrogen and lower alkyl.

2. A compound of the formula:

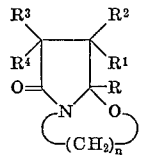

wherein R is aryl of the formula:

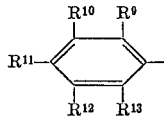

each of $R^1$, $R^2$, $R^3$ and $R^4$ is a member selected from the group consisting of hydrogen and phenyl, at least one of $R^1$, $R^2$, $R^3$ and $R^4$ being hydrogen,
each of $R^9$, $R^{10}$, $R^{11}$, $R^{12}$ and $R^{13}$ is a member selected from the group consisting of a hydrogen, chloro, fluoro, bromo, lower alkyl, lower alkoxy, trifluoromethyl and lower alkyl-thio; at least one of $R^9$, $R^{10}$, $R^{11}$, $R^{12}$ and $R^{13}$ being hydrogen; a plurality of trifluoromethyl groups not being bound to adjacent carbon atoms; each of $R^9$ and $R^{13}$ of aryl group being hydrogen in a plurailty of such groups bound to the same carbon atom; each of $R^9$ of aryl group being hydrogen in a plurality of such groups bound to adjacent carbon atoms; and
$n$ represents 2 or 3.

3. A compound of claim 2 wherein R, $R^1$, $R^2$, $R^3$, and $R^4$ are as defined in claim 2 and $n$ represents 2.

4. A compound of claim 2 wherein R, $R^1$, $R^2$, $R^3$, and $R^4$ are as defined in claim 2 and $n$ represents 3.

5. A compound of the formula:

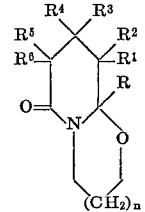

wherein
R is phenyl or phenyl substituted with up to 3 groups selected from the group consisting of lower alkyl, lower alkoxy, lower alkylthio, fluoro, chloro, bromo and trifluoromethyl and $R^1$, $R^2$, $R^3$, $R^4$, $R^5$, and $R^6$ and are selected from the group consisting of hydrogen, lower alkyl and phenyl and $n$ is an integer of from 2 to 3, inclusive.

6. A compound according to claim 1 which is 7a-(p-chlorophenyl)-tetrahydro-pyrrolo[2,1-b]-oxazol-5-(6H)-one.

7. A compound according to claim 1 which is 8a-phenyl-hexahydro-5H-oxazol[3,2-a]pyridine-5-one.

8. A compound according to claim 1 which is 7,7-dimethyl-8a-phenyl-hexahydro-5H-oxazol[3,2-a]pyridine-5-one.

9. A compound according to claim 1 which is 8a-phenyl-tetrahydro-2H-pyrrolo[2,1-b][1,2]-oxazin-6-(7H)-one.

10. A compound according to claim 1 which is 8a-(m-chlorophenyl)-tetrahydro-2H-pyrrolo[2,1-b][1,3]-oxazin-6(7H)-one.

11. A compound according to claim 1 which is 8a-(m-fluorophenyl)-tetrahydro-2H-pyrrolo[2,1-b][1,3]-oxazin-6(7H)-one.

12. A compound aclording to claim 1 which is 8a-(α,α,α-trifluoro-m-tolyl)-tetrahydro-2H-pyrrolo-[2,1 - b][1,3]oxazin-6(7H)-one.

13. A compound according to claim 1 which is 9a-phenyl-hexahydro-2H,6H-pyrido[2,1 - b][1,3]oxazin - 6-one.

14. 8a-p-methoxyphenyl-3,4,6,7,8,8a-hexahydro - 2H-pyrrolo[2,1-b][1,3]oxazin-6-one.

15. 8a(4-fluorophenyl)-3,4,6,7,8,8a-hexahydro-2H - pyrrolo[2,1-b][1,3]oxazin-6-one.

16. 8a(4-methylphenyl)-3,4,6,7,8,8a-hexahydro-2H-pyrrolo[2,1-b][1,3]oxazin-6-one.

17. 8a-(4-chlorophenyl)-3,4,6,7,8,8a-hexahydro - 2H-pyrrolo[2,1-b][1,3]oxazin-6-one.

References Cited
UNITED STATES PATENTS 3,334,095    8/1967    Houlihan _____ 260—244

HENRY R. JILES, Primary Examiner

R. T. BOND, Assistant Examiner

U.S. Cl. X.R.

260—294.7, 293.4, 307; 424—248

CASE 4-1930/R

PO-1050
(5/69)

UNITED STATES PATENT OFFICE
CERTIFICATE OF CORRECTION

Patent No. 3,631,168      Dated December 28, 1971

Inventor(s) WILFRIED GRAF ET AL

It is certified that error appears in the above-identified patent and that said Letters Patent are hereby corrected as shown below:

Column 8, claim 9, change "[1,2]" to read --- [1,3] ---.

Signed and sealed this 20th day of June 1972.

(SEAL)
Attest:

EDWARD M. FLETCHER, JR.
Attesting Officer

ROBERT GOTTSCHALK
Commissioner of Patents